UNITED STATES PATENT OFFICE.

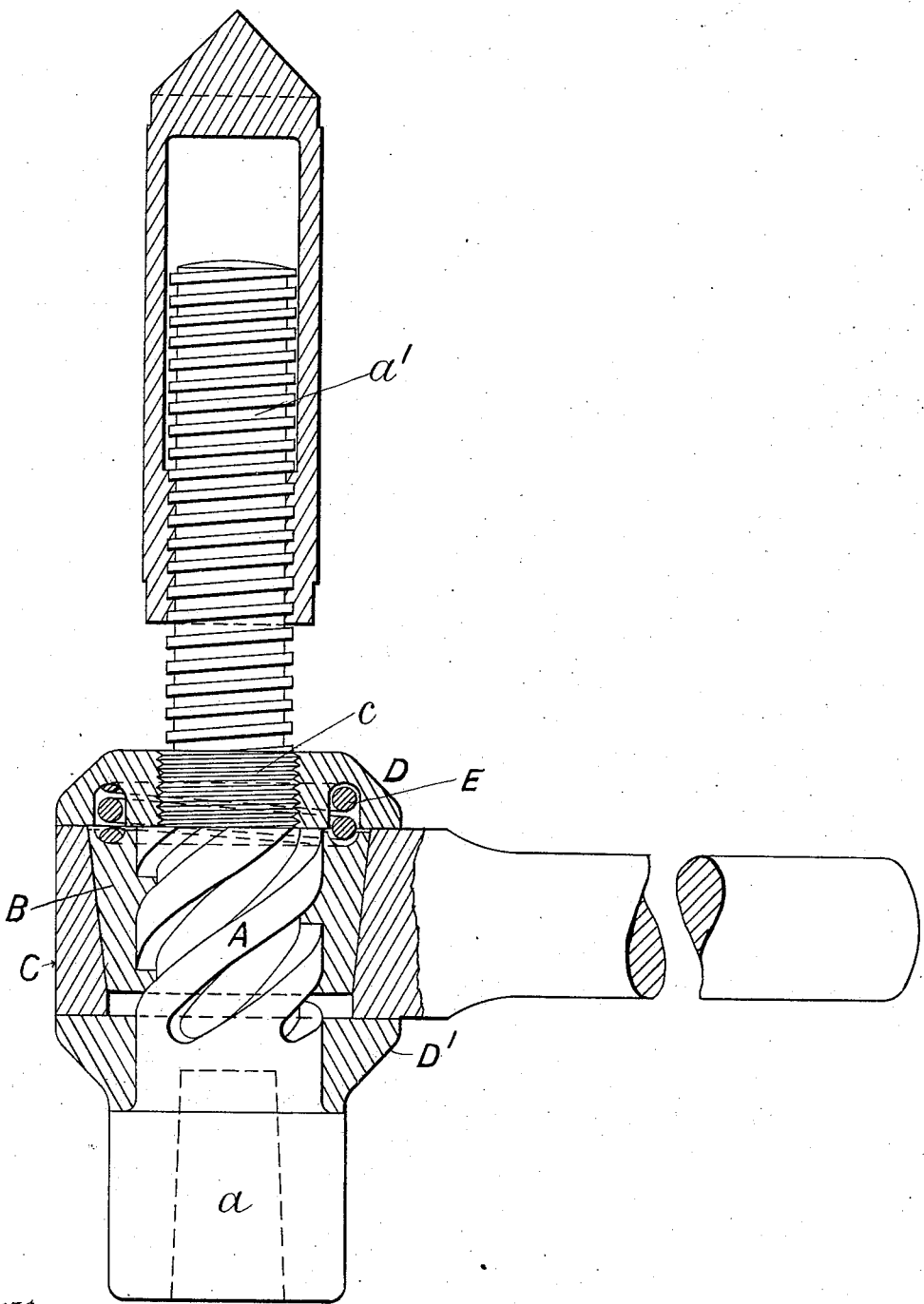

CHARLES DAVY, OF SHEFFIELD, COUNTY OF YORK, ENGLAND.

RATCHET-DRILL.

SPECIFICATION forming part of Letters Patent No. 365,587, dated June 28, 1887.

Application filed December 30, 1886. Serial No. 222,954. (No model.)

*To all whom it may concern:*

Be it known that I, CHARLES DAVY, at present residing at 24 Lawson Road, Sheffield, in the county of York, England, engineer, have invented a new and useful Improved Drill-Brace, of which the following is a full, clear, and exact description.

The object of this invention is to substitute a silent motion for the pawl and ratchet-wheel used in ratchet-braces, whereby a noiseless action and an instantaneous grip are obtained and lost motion avoided.

The invention consists of a friction-clutch interposed between the handle and spindle and formed by an externally-coned nut screwing on a thread of rapid pitch cut upon the tool-spindle and fitting in a correspondingly coned eye on the handle, the eye being confined between fixed collars, and a spring forcing the coned surface of the nut constantly into frictional contact with that of the eye, so that on the working stroke of the handle the nut will turn with the handle and become jammed, and on the return-stroke the eye will turn on the nut.

Reference is to be had to the accompanying drawing, forming part of this specification, which represents the improved tool in longitudinal section, the spindle being in elevation.

A is a coarse screw-thread of rapid pitch cut upon a suitable part of the spindle between the usual drill-socket, $a$, at one end and the usual feed-screw thread, $a'$, at the other end.

B is a nut threaded internally to fit A and turned of conical form externally.

C is the eye of the handle, bored conical internally to correspond to and fit accurately on B. The eye C is closely confined between collars D D' on the spindle, whereby the handle is maintained at right angles to the spindle. These collars may be held in place, the one by a shoulder turned on the spindle and the other by screwing on a threaded part, $c$, of the spindle, or they may be otherwise fixed. The length of the nut B is slightly less than the depth of the eye, as shown, and between the larger end of the nut and the adjacent collar (D, for example) is interposed a coiled spring, E, which is partly received in an annular groove turned in the face of said collar, and in the larger base of the nut, as shown.

In the example shown the upper end of the nut is of the largest diameter, the apex of the cone being toward the drill, and the screw A is in the same direction as the feed-screw $a'$. Were the direction of the cone reversed with regard to the drill, the screw A would necessarily be of contrary direction.

The pitch of the screw A, the angle and mean diameter of the coned surfaces are so proportioned that when the handle is turned in the working direction the frictional contact between the coned surfaces will cause the nut to be carried round with the eye, whereby the nut will tend to screw itself along the thread on the spindle, and so to wedge itself still tighter in the eye. Since the eye and nut turn together as one, they consequently become jammed between the acting faces of the screw-thread A on the one hand and the opposing collar D' on the other hand, thus locking the handle rigidly to the spindle.

On the return or idle stroke of the handle the nut is screwed backward to an infinitely small extent until its external surface is out of tight contact with the eye, without, however, ceasing to be in frictional contact therewith, the eye then slipping upon the nut. As the cones never cease to be in contact, the gripping action on the forward stroke is practically instantaneous and silent.

Having now particularly described and ascertained the nature of the said invention and in what manner the same is to be performed, I declare that what I claim is—

In a drill-brace, a friction-clutch for transmitting motion from the handle to the spindle, consisting of a screw-thread of rapid pitch upon the spindle, a nut screwing thereon and of conical form externally, an eye attached to the handle fitting on the nut and free to rotate, but incapable of longitudinal motion, and a spring or its equivalent tending to force the nut more tightly into the eye, the whole combined for operation substantially as shown and described.

The foregoing specification of my improved drill-brace signed by me this 16th day of December, 1886.

CHARLES DAVY.

Witnesses:
 ALEXANDER MELVILLE CLARK,
  53 *Chancery Lane, London, Patent Agent.*
 HERBERT E. DALE,
  17 *Gracechurch Street, London, E. C., Notarial Clerk.*